Nov. 24, 1964

D. F. SELLERS 3,158,340

GYROSCOPIC CONTROL APPARATUS

Filed Nov. 15, 1961

DONALD F. SELLERS
INVENTOR.

BY William L. Jones

ATTORNEY

Nov. 24, 1964 D. F. SELLERS 3,158,340
GYROSCOPIC CONTROL APPARATUS
Filed Nov. 15, 1961 2 Sheets-Sheet 2

DONALD F. SELLERS
INVENTOR.

BY Robert M. Sperry
ATTORNEY

United States Patent Office 3,158,340
Patented Nov. 24, 1964

3,158,340
GYROSCOPIC CONTROL APPARATUS
Donald F. Sellers, Dallas, Tex., assignor, by mesne assignments, to Ling-Temco-Vought, Inc., Dallas, Tex., a corporation of Delaware
Filed Nov. 15, 1961, Ser. No. 152,516
9 Claims. (Cl. 244—79)

This invention relates to gyroscopic control apparatus and to control systems employing gyroscopes, such as to produce torque that influences or tends to influence the behavior of an object, such as a body or vehicle in which the control system is mounted.

One application wherein the invention provides particular advantages is in connection with controlling the attitude of satellites or vehicles operating in outer space. As used herein, "outer space" includes space beyond the earth's atmosphere or where otherwise the satellite or vehicle is subject to little or no influence due to aerodynamic or other forces such as are comonly encountered during travel through a fluid medium that is not substantially rarified.

It is anticipated that the invention will be applied most widely in control systems of the type wherein oppositely spinning gyroscope rotors are employed, particularly where a matched pair of gyroscopes having oppositely spinning rotors are arranged so that the gimbal rings or frames in which the rotors are mounted may be rotated equally and oppositely with respect to each other to produce torque along an axis disposed at right angles both to the axes about which the gimbal rings or frames are turned and to the axes of the spinning rotors mounted therein.

In systems of the type described, it is desirable for the pair of gyroscopes to be mounted in a common support or main frame. For example, the arrangement may include a rectangularly-shaped common frame having the gyroscopes mounted cross-wise thereof and having a longitudinal axis about which torque is produced when the oppositely spinning rotors are given equal and opposite angular displacements with respect to each other. Where the common frame is fixed to or integral with the main frame of a satellite or vehicle operating in outer space, the torque produced will influence the attitude of the satellite or vehicle. By employing the foregoing and additional pairs of similarly mounted gyroscopes in an arrangement such that the aforesaid longitudinal axis, for example, of each rectangularly-shaped common frame is disposed along one of the principal axes of the satellite or vehicle, torques may be produced so as to influence its attitude with regard to roll, pitch, and yaw, as desired.

In attempting to design gyroscopic control systems of the type described for use in satellites and space vehicles, however, certain difficulties have been encountered. For example, where the satellite or vehicle will be operating in outer space, difficulties may arise due to the presence of undesired counter-acting torques resulting from attempts to produce torques that are needed to control the attitude of the satellite or vehicle. In particular, since the aerodynamical forces encountered by vehicles in ordinary air travel will be largely if not completely absent, these forces cannot be relied upon to damp undesired torques produced in satellites or vehicles operating in outer space.

A general object of the present invention is to provide improved gyroscopic control apparatus.

Another object of the invention is to provide an improved gyroscopic control system useful in producing torque to influence the behavior of an object, such as a body or vehicle in which the control system is mounted.

A more specific object of the invention is to provide an improved gyroscopic control system for use in controlling the attitude of a satellite or vehicle operating in outer space.

Another object of the invention is to provide improved gyroscopic control apparatus having provision whereby certain undesired torques produced therein are substantially cancelled or sufficiently damped to substantially reduce their influence in a system employing the control apparatus.

A further object of the invention is to provide an improved gyroscopic control system useful in producing torques to control or change the attitude of a satellite or vehicle operating in outer space and having provision for substantially reducing or preventing undesired effects due to counter-acting torques that tend to be produced.

In accordance with one aspect of the invention, there is provided gyroscopic control apparatus which includes gyroscopic means and a pair of independently mounted torque-producing devices or motors for use in causing precession of the gyroscopic means. In a preferred arrangement, the gyroscopic means includes a matched pair of gyroscopes having rotors adapted to spin in opposite or counter-rotating directions. Each rotor is mounted in a gimbal ring or the like provided therefor. For each of the pair of gyroscopes there is an associated torque producing device or motor with each gyroscope and motor being included in a unit which is independently mounted on a frame or support common to the two gyroscope units.

In accordance with related aspects of the invention, a gyroscopic control system is provided which includes a pair of the aforesaid gyroscope units independently mounted on a common frame or support, together with circuit means for supplying input or command signals to the torque-producing devices or motors, which in response to such signals are adapted to cause angular displacements of the gyroscopes associated therewith by equal amounts in opposite directions, and including means for deriving feedback signals for each of the gyroscope units representing changes occurring in the angular relationship between the frame or support and the gimbal ring in which the gyroscope rotor is mounted, the feedback signals for each unit being supplied to the input circuit controlling its respective angular-displacement device or motor. Additionally, provision is preferably included for deriving a feedback signal for each of said angular-displacement devices or motors representing the amount of torque produced thereby, the signal for each such device or motor being supplied to the aforesaid input circuit of its unit as an additional damping signal.

Where the attitude of a satellite or vehicle operating in outer space is to be controlled, several of the foregoing gyroscope control systems may be employed, such as one for each of the principal axes of the body or craft involved. The frame or support for each system is preferably fixed to or integral with that of each of the other systems and with the main frame or chassis of the satellite or space vehicle. Where torque is produced that rotates the satellite or vehicle about an axis the control system for which is not then receiving a command signal, angular displacements of the gyroscopes in this system may also tend to occur. However, the derived feedback signals oppose these angular displacements. Also, the arrangement is such that undesired torques resulting from such displacement tendencies tend to cancel each other.

The foregoing and additional objects, advantages, and novel features of the invention will be more apparent from the following description when read in conjunction with the accompanying drawing in which similar reference characters designate similar parts in both views and wherein.

Figure 1:
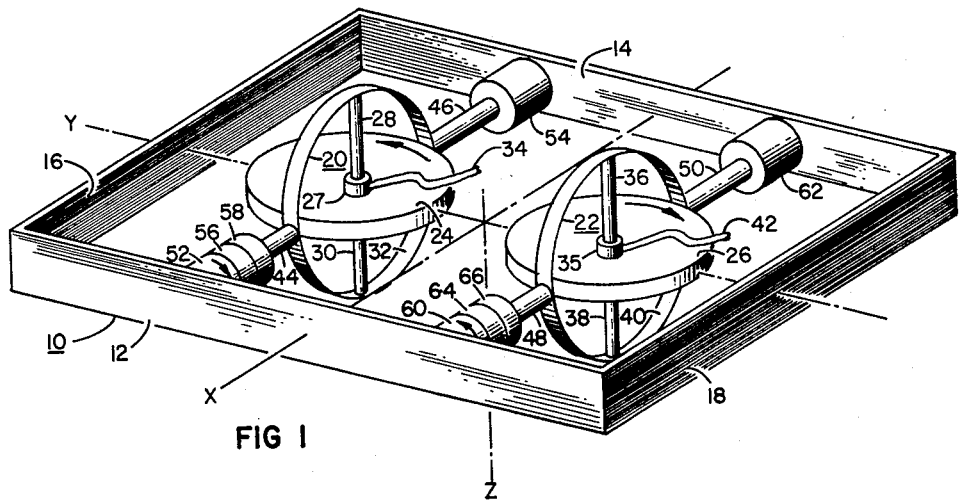
FIGURE 1 is a perspective view of gyroscopic control apparatus in accordance with the invention.

Referring to the drawing in detail, and first to the arrangement of FIGURE 1, the invention is there shown and is hereinafter described, by way of example, as being applied to control apparatus which includes a rectangularly-shaped support or frame 10 having three principal axes designated X, Y and Z, respectively.

It will be noted that the dashed or broken line corresponding to or indicating the X-axis extends cross-wise of the frame 10 and through the mid-portions of longitudinal sides 12 and 14 thereof. The line corresponding to or indicating the Y-axis extends lengthwise of the frame 10 and through the mid-portions of transverse sides 16 and 18 thereof. The line corresponding to or indicating the Z-axis extends perpendicularly through the plane of the area enclosed by the frame 10, crossing the meeting point of the lines indicating the X and Y axes. Thus, the X, Y, and Z axes of the frame 10 are mutually perpendicular.

The control apparatus of FIGURE 1 also includes a matched pair of gyroscopes 20 and 22 having oppositely rotatable or spinning rotors 24 and 26, respectively, through the centers of which passes the aforesaid Y-axis. As shown by the arrows in the drawings, the rotor 24 spins in a counterclockwise direction, for example, while the rotor 26 spins in a clockwise direction, for example.

It is understood that any of various means may be employed for rotating or spinning the gyroscope rotors 24 and 26. It is preferred that they be driven by synchronous motors or otherwise at the same speed. In the arrangement shown, the rotors 24 and 26 are themselves parts of the driving motors, being disc-like rotating portions of "inside-out" type motors the stators of which are stationary armatures.

The rotor 24 of the gyroscope 20 is shown encircling a central stationary armature 27 which is fixedly mounted between the adjacent ends of an upper shaft section 28 and a lower shaft section 30. The opposite or non-adjacent ends of the shaft sections 28 and 30 are fixedly secured to a gimbal ring 32. The arrangement is such that the rotor 24 may be rotated with respect to the ring 32 and parts fixed thereto by supplying electrical energy to the stationary armature 27, such as by means of electrical cable 34 shown extending out of an opening suitably provided therefor in the armature 27.

In a similar arrangement, the rotor 26 of the gyroscope 22 is shown encircling a central stationary armature 35 which is fixedly mounted between the adjacent ends of an upper shaft section 36 and a lower shaft section 38. The opposite or non-adjacent ends of the shaft sections 36 and 38 are fixedly secured to a gimbal ring 40. The arrangement is such that the rotor 26 may be rotated with respect to the ring 40 and parts fixed thereto by supplying electrical energy to the stationary armature 35, such as by means of electrical cable 42 shown extending out of an opening suitably provided therefor in the armature 35.

It will be noted that the gimbal rings 32 and 40 extend transversely or cross-wise of the frame 10 and that the shafts on which they are mounted are disposed in generally parallel, spaced-apart relation to each other and to the aforesaid X-axis of the frame 10. As will appear more fully hereinafter, these shafts are adapted to be driven by separate torque-producing devices and are mounted so that the pair of gyroscope units mounted thereon are independently displaceable angularly with respect to the frame 10.

The gimbal ring 32 is shown mounted between sections 44 and 46 of a shaft which extends cross-wise of the frame 10 and which is fixedly secured to the ring 32 at points such that the shaft sections 44 and 46 are disposed at right angles to the shaft sections 28 and 30 between which the rotor 24 is mounted.

In a similar arrangement, the gimbal ring 40 is shown mounted between sections 48 and 50 of a shaft which extends cross-wise of the frame 10 and which is fixedly secured to the ring 40 at points such that the shaft sections 48 and 50 are disposed at right angles to the shaft sections 36 and 38 between which the rotor 26 is mounted.

As previously indicated, the shafts carrying the gimbal rings 32 and 40 are mounted for independent rotation or angular displacement with respect to the frame 10.

Thus, the shaft section 44, which has one end thereof secured to the gimbal ring 32, has its other or remote end coupled to a torque-producing device or motor 52, which is preferably a reversible servo motor adapted to produce angular displacement of the shaft carrying the ring 32 in either a clockwise or a counter-clockwise direction. The shaft section 46, which has one end thereof secured to the gimbal ring 32, has its other or remote end coupled to a transducer 54, which may be a potentiometer having its arm movable with the shaft section 46. The transducer 54 is adapted to derive a feedback voltage or signal that changes as changes occur in the angular relationship between the gimbal ring 32 and the frame 10. This feedback voltage becomes more negative or more positive, depending upon the direction of rotation and is ordinarily zero when the gimbal ring 32 is in its initial position perpendicular to the frame 10.

It is preferred that damping or feedback control of the motor 52 be additionally obtained from means, such as a tachometer 56, coupled directly to the output of the motor 52. The motor 52 is shown connected through suitable reducing gears 58 to the shaft section 44. The tachometer 56 is adapted to produce a feedback signal or voltage that is a function of the speed of rotation of the driven shaft of the motor 52, the feedback voltage being negative or positive, depending upon the direction of rotation.

In a similar arrangement, the shaft section 48, which has one end thereof secured to the gimbal ring 40, has its other or remote end coupled to a torque-producing device or motor 60, which may be a reversible servo motor similar to the motor 52 described above, and which is adapted to produce angular displacement of the shaft carrying the ring 40. The shaft section 50, which has one end thereof secured to the gimbal ring 40, has its other or remote end coupled to a transducer 62, which may be a potentiometer having its arm movable with the shaft section 50. The transducer 62 is adapted to derive a feedback voltage or signal that changes as changes occur in the angular relationship between the gimbal ring 40 and the frame 10. This feedback voltage becomes more negative or more positive, depending upon the direction of rotation, and is ordinarily zero when the gimbal ring 40 is in its initial position perpendicular to the frame 10.

As previously indicated with reference to the motor 52, it is preferred also that damping or feedback control of the motor 60 be additionally obtained from means, such as a tachometer 64, coupled to the output of the motor 60. The motor 60 is shown connected through siutable reducing gears 66 to the shaft section 48. The tachometer 64 is adapted to produce a feedback signal or voltage that is a function of the speed of rotation of the driven shaft of the motor 60, the feedback voltage being negative or positive, depending upon the direction of rotation.

Figure 2:
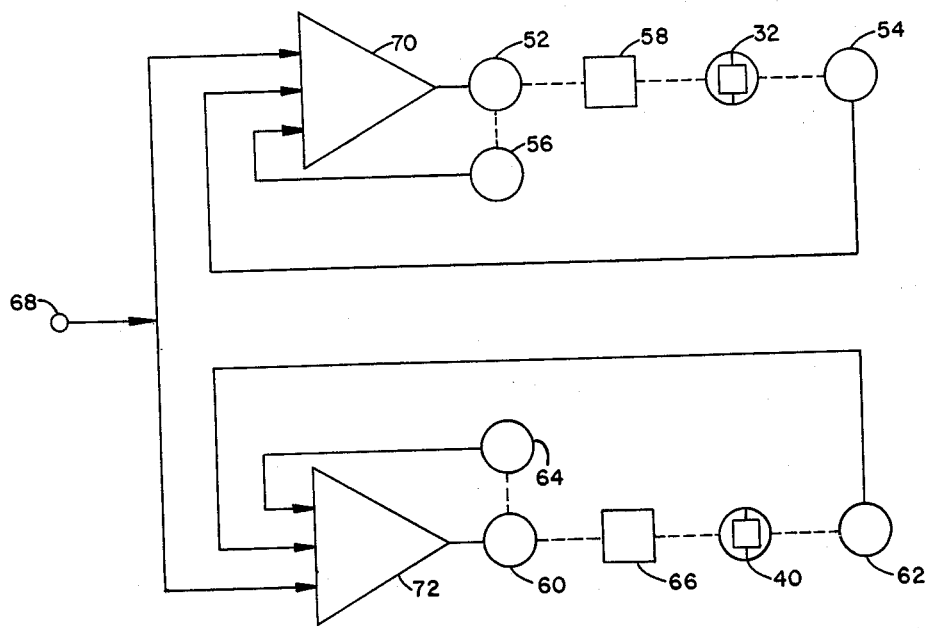
FIGURE 2 is a block-diagram of a gyroscopic control system including the apparatus of FIGURE 1.

Referring now to FIGURE 2, the invention is shown applied in a control-system arrangement wherein the angular-displacement motors 52 and 60 receive input or command signals from a common source, such as from a guidance or control system located within the satellite or space vehicle the attitude of which is to be controlled, or perhaps from a remote location, such as by means of telemetering operations involving the reception of signals from a transmitting station located on the earth.

It will be noted in FIGURE 2 that an input terminal 68 is shown for making connection to a conductor cable or the like extending to related equipment, such as to the guidance or control system. The circuit arrangement is such that an input or command signal voltage appearing at terminal 68 is supplied through an amplifier 70 to the motor 52 and is also supplied through an amplifier 72 to the motor 60.

The motors 52 and 60 are reversible motors which are preferably adapted, as will appear more fully hereinafter, to cause angular displacement of the gimbal rings 32 and 40 by equal amounts in opposite directions for a given value and polarity of input or command signal appearing at terminal 68. In the arrangement shown, the motors 52 and 60 are connected so as to have their driven shafts rotate in opposite directions for a given polarity of input signal. Alternatively, the motors 52 and 60 may be connected identically, as to direction of rotation, but may be supplied with input signals of opposite polarity, such as where the input signal supplied to one of the motors 52 or 60 is first passed through a suitable polarity reverser.

The amplifiers 70 and 72 may be summing amplifiers, to the input circuits of which are supplied not only the input or command signal voltages, but also the respective feedback voltages derived, as aforesaid, by the transducers 54 and 62 and by the tachometers 56 and 64. As previously indicated, the feedback voltages derived by the transducers 54 and 62 represent the amounts of angular displacement of the gimbal rings 32 and 40, respectively, with respect to the frame 10, while the additional feedback voltages derived by the tachometers 56 and 64 represent the amounts of torque produced by the angular-displacement motors 52 and 60, respectively.

The polarities of these feedback voltages are such as to tend to drive the gimbal rings 32 and 40 back to perpendicularity with respect to the frame 10 (see FIGURE 1).

Figure 3:
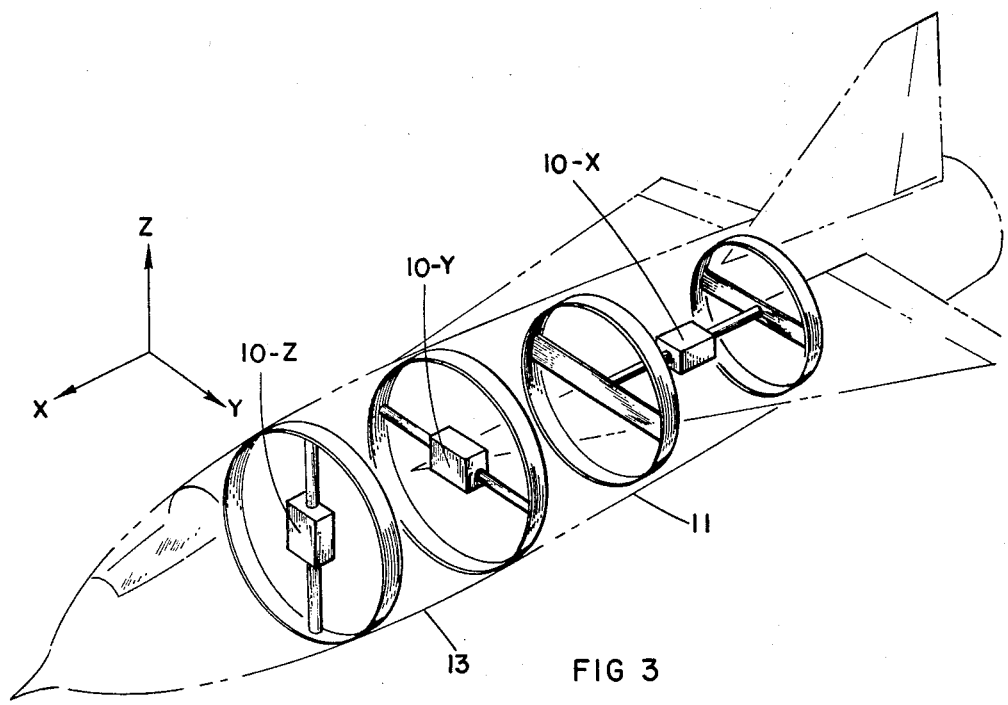
FIGURE 3 is a diagrammatic representation of a space vehicle embodying three sets of the apparatus of FIGURES 1 and 2.

It will be understood that the satellite or vehicle in which the system of FIGURE 2 is mounted will ordinarily have similar systems for each of its principal axes, such as for its roll, pitch, and yaw axes. Referring to the arrangement of FIGURE 1, the Y-axis of the frame 10 will ordinarily correspond to one of the principal axes of the satellite or vehicle. Thus, there will ordinarily be additional frames such as the frame 10 having their respective longitudinal axes parallel to the X and Z axes of FIGURE 1. As shown in FIGURE 3, a satellite or space vehicle 11 is illustrated having a main frame 13 and three sets of equipment each of which includes the apparatus shown in FIGURES 1 and 2, with the frames on which the equipment 10-X, 10-Y and 10-Z is mounted being oriented with respect to each other so as to have mutually perpendicular longitudinal axes extending substantially parallel to the principal axes of the vehicle 11, as indicated by arrows X, Y and Z. The several frames, such as frame 10 of FIGURE 1, will ordinarily be fixed to or integral with each other and also with the main frame of the satellite or vehicle in which the equipment is mounted.

The operation of the invention will now be described with particular reference to its application in controlling the attitude of a satellite or vehicle about its principal axes, which are assumed to correspond to the X, Y, and Z axes of FIGURE 1, there being a control system for each of such axes, as previously indicated.

Before the satellite or vehicle reaches outer space, the gyroscope rotors 24 and 26 of each control system will ordinarily have been suitably oriented, such as by locking the gimbal rings 32 and 40 of each system in their initial positions perpendicular to the frame 10, as shown in FIGURE 1. When outer space is reached, the gimbal rings 32 and 40 are unlocked, such as by remote control or in response to built-in lock-releasing means. At or prior to this time, the gyroscope rotors 24 and 26 are actuated and start spinning in opposite directions, as shown by the arrows thereon in FIGURE 1, and preferably at equal speeds.

For purposes of further explanation, it will be assumed that the satellite or space vehicle is traveling in outer space and it is desired to change its attitude about the principal vehicle axis that corresponds to the Y-axis of FIGURE 1. This will be assumed to be the pitch axis of the satellite or vehicle, and consideration will be given, first, to the situation where a "pitch-down" input or command signal is supplied to the input terminal 68 of FIGURE 2. It is understood that this signal may be derived, for example, from an inertial guidance reference system mounted also in the satellite or vehicle to be controlled.

In the arrangement shown, the "pitch-down" signal voltage will be a positive or negative voltage, depending upon the manner of connecting the reversible angular-displacement motors 52 and 60. For example, if the motor 52 is connected so as to rotate in the clockwise direction when the command voltage appearing at terminal 68 is positive, the motor 60 will be connected so as to rotate in the counter-clockwise direction under the same circumstances.

By way of example, it will be assumed that when the input or command voltage appearing at terminal 68 is positive, clockwise torque is produced by the motor 52 in the shaft carrying the gimbal ring 32, while counter-clockwise torque is produced by the motor 60 in the shaft carrying the gimbal ring 40. This condition of operation is indicated in FIGURE 1 by the arrows appearing on the motors 52 and 60.

It will be noted that the torque produced by each of the motors 52 and 60 is applied so as to cause angular displacement of its associated gimbal ring 32 or 40 in the same clockwise or counter-clockwise direction as the produced torque is applied.

In accordance with the basic principles of gyroscopes, torque applied by the motor 52 in a direction such as to displace the gimbal ring 32 in a clockwise direction results, due to the law of precession, in producing torque that tends to displace the counter-clockwise spinning rotor 24 and its gimbal ring 32 in a clockwise direction about the Y-axis, which is the axis perpendicular both to the spin axis of the rotor 24 and to the axis of rotation of the ring 32.

At the same time, torque applied by the motor 60 in a direction such as to displace the gimbal ring 40 in a counter-clockwise direction results, due to the law of precession, in producing torque that tends to displace the clockwise spinning rotor 26 and its gimbal ring 40 in the same clockwise direction about the Y-axis, which is the axis perpendicular both to the spin axis of the rotor 26 and to the axis of rotation of the ring 40.

Thus, assuming that rotation of the frame 10 of FIGURE 1 in a clockwise direction about the Y-axis corresponds to the "pitch-down" situation, the attitude of the satellite or space vehicle may be caused to change in this respect by supplying a positive command voltage to the gyroscopic control system, such as to the input terminal 68 of FIGURE 2.

Where a negative or "pitch-up" command voltage is supplied to the terminal 68, the torque produced by each of the motors 52 and 60 is applied so as to cause angular displacement of its associated gimbal ring 32 or 40 in the opposite direction from the foregoing. That is, the direction of angular displacement of the ring 32 is counter-clockwise, while the direction of angular displacement of the ring 40 is clockwise. Under these conditions, the resulting torques tend to rotate the frame 10 in a counter-clockwise direction about the Y-axis, which in the example given corresponds to the desired "pitch-up" change of attitude of the satellite or vehicle.

One advantage arising from using an arrangement in accordance with the present invention is that the counter-acting torques that are produced in the common frame 10 during operation of the angular-displacement motors 52 and 60 are ordinarily of equal amounts and applied in opposite directions, with the result that these counter-acting torques tend to cancel each other in the frame 10 and, thus, do not themselves appreciably influence the attitude of the satellite or vehicle.

As previously indicated, it is possible to employ additional gyroscopic control systems of the foregoing type in the same satellite or vehicle, such as to produce torque as needed or desired to change the attitude of the vehicle about its roll axis or its yaw axis.

In this connection, it will be understood that where an input or command signal is supplied to one of the several control systems and torque is produced thereby to change the attitude of the satellite or vehicle about one of its principal axes, as aforesaid, the resulting rotation may tend to cause precession of the gyroscopes included in one or both of the other control systems, each of which may not then be receiving an input or command signal of its own, such as from the guidance system connected to its input terminal 68.

Another advantage arising from using the arrangement herein disclosed is that any tendency of one of the several gyroscope control systems provided in a satellite or vehicle to produce torque due to precession occurring in the absence of an input or command signal as aforesaid will result in the development of feedback voltages of suitable polarity to restore the gimbal rings 32 and 40 of the gyroscopes 20 and 22, respectively, to their initial perpendicular positions. Also, while the rings 32 and 40 are being thus restored, the torques produced due to the law of precession by the gyroscopes 20 and 22 will tend to cancel each other.

For example, it will be assumed that the frame 10 of FIGURE 1 is caused to rotate in a clockwise direction about its X-axis at a time when no input or command voltage is being supplied to cause precession of the gyroscopes 20 and 22. As a result of the frame rotation in a clockwise direction, the gimbal rings 32 and 40 will each in effect be displaced from the perpendicular in the opposite or counter-clockwise direction.

It will be recalled from the earlier examples that the feedback voltage derived by the transducers 54 and 62 were of equal value and of the same polarity when the rings 32 and 40 were rotated by equal amounts in opposite directions in response to a command voltage supplied to the input terminal 68. These equal and opposite feedback voltages tended to cause the rings 32 and 40 to return to their initial perpendicular positions, that is, tended to cause rotation of the rings 32 and 40 by equal amounts in directions that were opposite to each other and that were also opposite to the directions in which rotation in response to the command voltage occurred.

On the other hand, where the displacement of the rings 32 and 40 occurs in the same direction, as in the present example, the feedback voltages derived by the transducers 54 and 62 are of opposite polarity and, thus, tend to cause rotation of the rings 32 and 40 in the same, rather than opposite, directions with respect to each other. Thus, the counter-clockwise displacement of the ring 32 results in a positive feedback voltage being derived by the transducer 54, while the displacement in the same direction of the ring 40 results in a negative feedback voltage being derived by the transducer 62.

Assuming the same motor connections as before, i.e., as to direction of rotation, the positive feedback voltage applied to the input circuit of the amplifier 70 results in the motor 52 producing torque that tends to rotate the ring 32 in a clockwise direction and, thus, tends to restore it to its initial perpendicular position. At the same time, the negative feedback voltage applied to the input circuit of the amplifier 70 results in the motor 60 producing torque that tends to rotate the ring 40 in a clockwise direction and, thus, tends to restore the ring 40 also to its initial perpendicular position.

In accordance with the principles of gyroscopes, the torque applied by the motor 52 in a direction such as to rotate the ring 32 in a clockwise direction results, due to the law of precession, in producing torque that tends to rotate the frame 10 in a clockwise direction about the Y-axis. On the other hand, the torque applied by the motor 60 in a direction such as to rotate the ring 40 in the same clockwise direction results, since the rotor 26 of the gyroscope 22 is spinning in the opposite direction from the rotor 24 of the gyroscope 20, in producing torque that tends to rotate the frame 10 in the opposite or counter-clockwise direction about the Y-axis. Accordingly, these torques produced in the frame 10 tend to cancel each other.

For purpose of further explaining the operation of the invention, consideration will now be given to the possibility that a satellite or vehicle traveling in outer space may be subjected to external disturbances, such as due to radiation pressure or to meteroid impacts, which may cause displacement of the satellite or vehicle from a desired reference attitude. For handling these situations, the inertial guidance or other reference system mounted in the satellite or vehicle may advantageously include means for supplying suitable correction signals to the input terminal of any of the gyroscopic control systems that need to operate in order to produce corrective torque to return the satellite or vehicle to a suitable attitude.

As an example, it will be assumed that a meteoroid strikes the satellite or vehicle in a path that produces a "pitch-down" displacement. Angular momentum is imparted to the frame 10, causing it to pitch down or rotate clockwise about the Y-axis, for example, at a uniform angular velocity.

At any displacement angle, the guidance or reference system supplies to the input terminal 68 a "pitch-up" command signal. The operation of the motors 52 and 60 is such that the gyroscopes 20 and 22, due to the law of precession, produce torque that tends to rotate the frame 10 about the Y-axis in the opposite or counter-clockwise direction. The feedback voltages that are derived by the transducers 54 and 62 are of opposite polarity to the input or command signal voltage, as previously indicated. The command signal voltage continues to increase as the "pitch-down" displacement due to the impact increases, but the torque resulting from operation of the gyroscopic control system continues to oppose the "pitch-down" displacement until eventually the movement in that direction stops and reverses. The movement continues in the reversed direction until the satellite or vehicle has returned to the initial reference attitude.

While the invention has been described herein with particular reference to certain applications thereof, it is understood that these are by way of example and are not to be considered as limiting the scope of the invention, which is best defined with reference to the appended claims.

What is claimed is:

1. Gyroscopic control apparatus comprising a support, a pair of torque-producing devices mounted on said support, an input circuit for each of said torque-producing devices, a pair of gyroscopes each mounted for angular displacement with respect to said support by operation of one of said torque-producing devices, said gyroscopes having rotors adapted to spin simultaneously in opposite directions, said torque-producing devices being adapted to cause angular displacement of said gyroscopes in opposite directions in response to a common command signal supplied to each of said input circuits, means for deriving feedback signals representing the amounts of angular displacement of each of said gyroscopes with respect to said support, means for deriving additional feedback signals representing the amounts of torque produced by each of said torque-producing devices tending to cause such angular displacement, and means for supplying each of said feedback signals to the input circuit of the respective torque-producing device associated therewith.

2. Gyroscopic control apparatus comprising a support, a pair of torque-producing devices mounted on said support, an input circuit for each of said torque-producing devices, a pair of gyroscopes each including a rotor and a gimbal ring in which said rotor is mounted, said rotors being adapted to spin simultaneously in opposite directions, each of said gimbal rings being mounted for angular displacement with respect to said support by operation of one of said torque-producing devices in response to command signals of suitable polarity supplied from a common source to each of said input circuits, means for deriving feedback signals representing the angular displacements of each of said gimbal rings with respect to said support, means for deriving additional feedback signals representing the torques produced by each of said torque-producing devices tending to cause such angular displacement, and means for supplying each of said feedback signals to the input circuit of the respective torque-producing device associated therewith.

3. Gyroscopic control apparatus comprising a support, a pair of torque-producing devices mounted on said support, an input circuit for each of said torque-producing devices, a pair of gyroscopes having rotors adapted to spin simultaneously in opposite directions, each of said gyroscopes including a gimbal ring in which its rotor is mounted, said gimbal rings being mounted for angular displacement in opposite directions with respect to said support by operation of said torque-producing devices in response to command signals of suitable polarity supplied from a common source to each of said input circuits, means for deriving feedback signals representing the amounts of angular displacement of each of said gimbal rings with respect to said support, and means for deriving additional feedback signals representing the amounts of torque produced by each of said torque-producing devices tending to cause such angular displacement.

4. Gyroscopic control apparatus comprising a pair of torque-producing devices, an input circuit for each of said devices adapted to receive a command signal from related equipment, means for supplying to the input circuit of each of said devices a feedback signal representing the amount of torque produced by said device, a pair of gyroscopes each including a gimbal ring operatively coupled for angular displacement in response to the torque produced by one of said devices, and means for supplying to the input circuit of each of said devices a feedback signal representing the angular displacement of the gimbal ring coupled to said device.

5. Gyroscopic control apparatus comprising a support, a pair of torque-producing devices mounted on said support, an input circuit for each of said devices adapted to receive a command signal from related equipment, said devices being adapted to produce torques in opposite directions in response to command signals of suitable polarity supplied from a common source to each of said input circuits, means for supplying to the input circuit of each of said devices a feedback signal representing the amount of torque produced by said device, and a pair of gyroscopes having rotors adapted to spin simultaneously in opposite directions, each of said gyroscopes including a rotor and a gimbal ring in which said rotor is mounted, the gimbal ring of each of said gyroscopes being operatively coupled to one of said devices for angular displacement in response to the torque produced thereby.

6. Gyroscopic control apparatus comprising a support, a pair of torque-producing devices mounted on said support, an input circuit for each of said devices adapted to receive a command signal from related equipment, each of said devices including a reversible motor having a rotatable shaft, said motors being adapted to cause rotation of their respective shafts by substantially equal amounts in opposite directions in response to command signals of suitable amplitude and polarity supplied from a common source to the input circuit of each of said devices, tachometer means for each of said devices for deriving and supplying to the input circuit thereof a feedback signal representing the speed of rotation of its motor shaft, a pair of gyroscopes having rotors adapted to spin simultaneously in opposite directions, each of said gyroscopes including a gimbal ring in which its rotor is mounted, gear-reducing means for each of said motors coupling the shaft thereof to the gimbal ring of one of said gyroscopes, whereby said motors may be operated to cause independent angular displacements of said gyroscopes, and transducer means for each of said gyroscopes for deriving and supplying to the input circuit of each of said devices a feedback signal representing the angular displacement of its gimbal ring with respect to said support.

7. In a gyroscopic control system for a satellite or vehicle adapted to operate in outer space, the combination of a main frame having a plurality of mutually perpendicular axes each of which is substantially parallel to one of the principal axes of such vehicle, together with separate gyroscopic control apparatus for each of a plurality of said axes, each unit of said apparatus comprising: a pair of torque-producing devices mounted on said frame, an input circuit for each of said devices adapted to receive a command signal from related equipment, each of said devices including a reversible motor having a rotatable shaft, said motor shafts being rotatable in opposite directions in response to a common command signal supplied to the input circuit of each of said devices, tachometer means for each of said devices for deriving and supplying to the input circuit thereof a feedback signal representing the speed of rotation of its motor shaft, a pair of gyroscopes having rotors adapted to spin simultaneously in opposite directions, each of said gyroscopes including a gimbal ring in which its rotor is mounted, gear-reducing means for each of said motors coupling the shaft thereof to the gimbal ring of one of said gyroscopes, whereby operation of said motors tends to cause independent angular displacements of said gyroscopes in opposite directions, and transducer means for each of said gyroscopes for deriving and supplying to the input circuit of each of said devices a feedback signal representing the angular displacement of its gimbal ring with respect to an initial position.

8. A gyroscopic control system for a vehicle including
 a frame for said vehicle having a plurality of mutually perpendicular axes; and
 a plurality of gyroscopic control units each controlling movement of said frame about a respective one of said axes; each of said units comprising
 a pair of gyroscopes having rotors adapted to spin simultaneously in opposite directions mounted to control movement of said frame about said respective one of said axes,
 reversible motor means operable to produce simultaneous independent angular displaceemnt of said gyroscopes with respect to said frame,
 an input circuit for supplying signals to said motor means to cause said motor means to displace said gyroscopes simultaneously in opposite directions for producing desired movement of said frame about said respective one of said axes, and
 feedback means driven by said gyroscopes in response to displacement of said gyroscopes from a predetermined position by movement of said frame about an axis other than said respective one for supplying signals to said motor means to cause said motor means to displace said gyroscopes simultaneously in torque cancelling directions to restore said gyroscopes to said predetermined position.

9. A gyroscopic control system for a vehicle including
 a frame for said vehicle having a plurality of mutually perpendicular axes; and
 a plurality of gyroscopic control units each controlling movement of said frame about a respective one of said axes; each of said units comprising a pair of gyroscopes having rotors adapted to spin simultaneously in opposite directions mounted to control movement of said frame about said respective one of said axes, reversible motor means operable to produce simultaneous independent angular displacement of said gyroscopes with respect to said frame, an input circuit for supplying signals to said motor means to cause said motor means to displace said gyroscopes simultaneously in opposite directions for producing desired movement of said frame about said respective one of said axes, and feedback means driven by said gyroscopes in response to displacement of said gyroscopes from a predetermined position by movement of said frame about an axis other than said respective one for supplying signals to said motor means to cause said motor means to displace said gyroscopes simultaneously in a common direction to restore said gyroscopes to said predetermined position.

References Cited by the Examiner

UNITED STATES PATENTS

| | | | |
|---|---|---|---|
| 2,183,314 | 12/39 | Goddard | 244—79 |
| 2,902,772 | 9/59 | Ciscel | 33—204 X |
| 2,953,926 | 9/60 | Wrigley et al. | 74—34 X |
| 2,999,391 | 9/61 | Freebairn et al. | 74—5.37 |

MILTON BUCHLER, *Primary Examiner.*

ANDREW H. FARRELL, *Examiner.*